United States Patent [19]

Alberts et al.

[11] 4,376,185

[45] Mar. 8, 1983

[54] ORGANO-POLYSILOXANE-POLYESTER-VINYL GRAFT COPOLYMERS

[75] Inventors: Heinrich Alberts; Hans Friemann; Hans-Heinrich Moretto, all of Cologne; Hans Sattlegger, Odenthal, all of Fed. Rep. of Germany

[73] Assignee: Bayer Aktiengesellschaft, Leverkusen, Fed. Rep. of Germany

[21] Appl. No.: 207,033

[22] Filed: Nov. 14, 1980

[30] Foreign Application Priority Data

Nov. 28, 1979 [DE] Fed. Rep. of Germany ....... 2947964

[51] Int. Cl.$^3$ ..................... C08L 67/02; C08L 83/06; C08L 83/10
[52] U.S. Cl. ........................................ 525/29; 525/27; 525/404; 525/408; 525/411; 525/412; 525/444; 525/445
[58] Field of Search .......................... 525/29, 446, 445

[56] References Cited

FOREIGN PATENT DOCUMENTS

| 632070 | 12/1961 | Canada | 525/446 |
|---|---|---|---|
| 49-132184 | 12/1974 | Japan | 525/29 |
| 1012485 | 12/1965 | United Kingdom | 525/29 |

Primary Examiner—Wilbert J. Briggs, Sr.
Attorney, Agent, or Firm—Sprung, Horn, Kramer & Woods

[57] ABSTRACT

A co-grafted polymer comprising units of organopolysiloxanes with OH functional groups, polyesters and vinyl monomers, polymeric units of the vinyl monomers being linked to the organopolysiloxane and polyester units, is produced by polymerizing a suitable monomer dispersion. The product is suited for replacing all or some of the organopolysiloxane component in room temperature curable compositions containing organopolysiloxanes, silane cross-linking agents and a curing catalyst.

12 Claims, No Drawings

ORGANO-POLYSILOXANE-POLYESTER-VINYL GRAFT COPOLYMERS

The invention relates to stable co-grafted polymer dispersions which can be cured at room temperature and consist of organopolysiloxanes containing terminal OH functional groups and, if appropriate, other polydiorganosiloxanes, polyesters which can optionally additionally contain polyethers and can optionally be acylated, and vinyl polymers, a process for their preparation and the use of these co-grafted polymer dispersions.

Polymer systems which are based on organopolysiloxanes and are cured at room temperature are known (compare W. Noll, Chemie und Technologie der Silikone (Chemistry and Technology of the Silicones), Verlag Chemie GmbH, 1968, page 391 et seq.).

Furthermore, it is possible, and known, to prepare modified organopolysiloxanes by various procedures. Grafted polymers of organosiloxanes and vinyl polymers are described, for example, in British Patent Specifications 766,528, 806,582 and 869,482 and German Auslegeschrift 1,694,973. The use of organopolysiloxanes with an organic chain grafted on and at most 25% of aryl radicals in 1- or 2-component compositions which are cured at room temperature is described in German Auslegeschrift 1,694,973. It is stated that the hydroxypolysiloxanes employed according to the invention contain in each case up to at most 25% of aryl radicals. It is also state that the organic chain grafted on is formed by polymerized units of vinyl monomers, preferably styrene and acrylates.

In addition to the organopolysiloxanes which are modified by grafting, systems in which an unsaturated polyester is co-condensed with a functional organopolysiloxane are also known. The resulting co-condensate is dissolved in a vinyl monomer and the system is cured under the influence of free radicals. Cured resins which consist of an unsaturated polyester to the extent of 25-75% by weight, of a vinyl polymer to the extent of 25-75% by weight and of a siloxane component to the extent of 0.5-30% by weight are claimed, for example, in British Patent Specification 801,529. Such compositions which are cured during the vinyl polymerization by the crosslinking reaction with the unsaturated polyester/organosiloxane co-condensate and form crosslinked and insoluble shaped articles are unsuitable for the preparation of organosiloxane compositions which are cured at room temperature.

Aliphatic or mixed aliphatic-aromatic polyesters are important industrial starting materials for, for example, polyurethanes and lacquers. Mixtures of such polyesters and organopolysiloxanes are unstable and cannot be stored since separation of the incompatible phases takes place a short time after mixing has been effected.

Although it would be desirable for the excellent technological properties arising from aliphatic or mixed aliphatic-aromatic polyesters in polyurethane systems or lacquers—flexibility and elasticity and, in some cases, hardness and gloss, resistance to aging and the like being mentioned—also to be utilized for the preparation of organosiloxane elastomers, this has not yet been possible.

A further known technological disadvantage of silicone elastomers or other silicone compositions is that articles produced from these compositions cannot be lacquered or can only be provided with a lacquer coating of extremely unsatisfactory quality. A coherent covering layer is usually formed by the freshly applied lacquer only for a short time and in general lifts from the silicone surface during drying or exposes areas of non-lacquered surface varying in size.

An object of the invention is thus to provide multi-phase systems of organopolysiloxanes and aliphatic and mixed aliphatic-aromatic polyesters, the phases of which are stable.

An object of the invention, is also to provide silicone compositions which, if appropriate after the addition of plasticizers, such as, for example, organopolysiloxanes with methylene end groups, fillers, crosslinking agents, crosslinking catalysts and components which accelerate crosslinking, and after crosslinking at room temperature in a manner which is known per se, can be lacquered without problems.

Both objects are achieved by a process in which mixtures of organopolysiloxanes, polyesters, if appropriate mixtures thereof with polyethers or polyetheresters, and vinyl monomers are subjected to free radical polymerization in the presence of agents which form free radicals and if appropriate with the addition of carboxylic acid anhydrides. Stable dispersions which consist of a polyester component, an organopolysiloxane and polymerized units of one or more vinyl monomers and which contain graft copolymers, crosslinked via polymerized units of the vinyl monomers employed, of organopolysiloxanes and the polyester employed are obtained.

The invention thus relates to co-grafted polymer dispersions, characterized in that they contain organopolysiloxanes with OH functional groups and, if appropriate, other polydiorganosiloxanes, polyesters, which can optionally additionally contain polyethers and can optionally be acylated, vinyl monomer units polymerized in the presence of mixtures of these organopolysiloxanes and polyesters and, if appropriate, polyethers, and organopolysiloxane and polyester-(ether) components which are linked via vinyl polymer bridges.

The present invention relates to co-grafted polymer dispersions comprising about I. 10-90% by weight of organopolysiloxanes containing terminal OH functional groups, II. 5-85% by weight of optionally acylated polyesters, III. 0-50% by weight of optionally acylated polyethers and IV. 5-85% by weight of polymerized units of vinyl compounds, the sum of components I-IV always being 100%.

The invention also relates to co-grafted polymer dispersions, characterized in that the aliphatic or mixed aliphatic-aromatic polyesters are modified by reaction with carboxylic acid anhydrides, carboxylic acids or carboxylic acid halides.

Advantageously the polyesters are aliphatic or mixed aliphatic-aromatic, and the vinyl compounds are vinyl esters, $\alpha,\beta$-unsaturated mono- or di-carboxylic acids, vinyl-aromatic compounds, such as styrene, $\alpha$-methylstyrene or 4-chlorostyrene, $\alpha$-olefins, such as ethylene, propylene, 1-butene or isobutylene, halogenated vinyl monomers, such as vinyl chloride, vinylidene chloride, vinyl fluoride, vinylidene fluoride, tetrafluoroethylene or trifluorochloroethylene, vinyl ethers, such as ethyl vinyl ether or n-butyl vinyl ether, allyl compounds, such as allyl alcohol, allyl acetate, allyl carbonates, diallyl carbonate or diallyl phthalate, divinyl compounds, such as divinylbenzene or divinyl ethers, or (meth)acrylic acid esters of polyhydric alcohols, or mixtures of the monomers.

Of the 5–85% by weight of vinyl compounds constituting (IV) advantageously 0–85% by weight are polymerized vinyl acetate units and 5–80% by weight are polymerized units of alkyl (meth)acrylates with 1–8 C atoms in the alkyl component, (meth)acrylamide, N-alkyl-substituted (meth)-acrylamides, (meth)acrylonitrile and mixtures thereof.

One preferred sub-group of dispersion comprises about I. 30–90% by weight of organopolysiloxanes containing terminal OH functional groups, II. 5–65% by weight of aliphatic or mixed aliphatic-aromatic polyesters, which can optionally be acylated, III. 0–50% by weight of polyethers, which can optionally be acylated, and IV. 5–65% by weight of polymerized units of (a) 5–90% by weight of styrene, (b) 10 95% by weight of alkyl (meth)acrylates with 1–8 C atoms in the alkyl component and (c) 0–85% by weight of (meth)acrylonitrile, the sum of components (a)–(c) always being 100% and the sum of the components from I–IV likewise always being 100%.

Another co-grafted polymer dispersion according to the invention preferably comprises about I. 30–90% by weight of organopolysiloxanes containing terminal OH functional groups, II. 5–65% by weight of aliphatic or mixed aliphatic-aromatic polyesters and III. 5–65% by weight of polymerised vinyl acetate units, the sum of components I–III always being 100%.

Still another co-grafted polymer dispersion comprises about I. 10–90% by weight of organopolysiloxanes containing terminal OH functional groups, II. 0–30% by weight of organopolysiloxanes with trimethylsilyl end groups, III. 5–60% by weight of aliphatic or mixed aliphatic aromatic polyesters, IV. 0–50% by weight of a polyether and V. 5–85% by weight of polymerized vinyl monomer units, the sum of components I–V always being 100%.

The invention also relates to a process for the preparation of co-grafted polymer dispersions, characterized in that mixtures of about I. 8–80% by weight of organopolysiloxanes containing terminal OH functional groups, II. 4.999–85% by weight of aliphatic or mixed aliphatic-aromatic polyesters. II. 0–50% by weight of a polyether, IV. 5–85% by weight of one or more vinyl monomers, V. 0.001–2% by weight of one or more agents which form free radicals, VI. 0–5% by weight of a molecular weight regulator and VII. 0–5% by weight of a carboxylic acid, carboxylic anhydride or carboxylic acid halide are subjected to a polymerization reaction and, if appropriate, an acylation reaction at temperatures between about −20° C. and +250° C.

The invention furthermore relates to organopolysiloxane compositions which can be crosslinked at room temperature and contain the co-grafted polymer dispersions and, in addition, crosslinking agents, curing catalysts, fillers, and if appropriate, further additives.

The invention also relates to the use of organopolysiloxane compositions which can be crosslinked at room temperature and contain the co-grafted polymer dispersions according to the invention, as one- or two-component systems for sealing compositions.

The co-grafted polymer dispersions are prepared by a procedure in which mixtures of an organopolysiloxane containing terminal OH functional groups, an aliphatic or mixed aliphatic-aromatic, optionally acylated polyester, optionally mixed with a polyether, which can likewise be acylated, and one or more vinyl monomers are brought, in the presence of an agent which forms free radicals, to a reaction temperature which triggers the polymerization. If desired, it is also possible to introduce mixtures of organopolysiloxanes containing terminal OH functional groups and non-functional organopolysiloxanes into the reaction mixture. The polymerization can be carried out by a continuous or discontinuous process. In principle, the components to be reacted can be added in any desired sequence, but the best results are achieved if mixtures of the siloxane and polyester components and the vinyl monomers are employed simultaneously in carrying out the polymerization reaction.

The organopolysiloxanes containing terminal OH functional groups are essentially linear and are represented by the following formula:

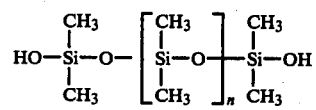

n = 10 to 5,000

Up to 30 Mol % of the methyl groups may be replaced by ethyl groups, vinyl groups and phenyl groups, but methyl-substituted organopolysiloxanes are preferably employed.

The aliphatic or mixed aliphatic-aromatic polyesters employed for the co-grafting polymerisation are prepared by a manner which is known per se, by an esterification or trans-esterification reaction of mixtures of aliphatic or aromatic dicarboxylic acids, or their anhydrides or esters, and aliphatic dialcohols (compare Ullmanns Enzyklopädie der technischen Chemie (Ullmann's Encyclopaedia of Industrial Chemistry), volume 14; Urban and Schwarzenberg, Munich, 1963, page 80 et seq.).

The dicarboxylic acids which are preferably employed are adipic acid, sebacic acid, terephthalic acid, phthalic acid, isophthalic acid, maleic acid, fumaric acid and itaconic acid; the polyhydric alcohols employed are preferably ethylene glycol, propane-1,2-diol and -1,3-diol, butane-1,3-diol and -1,4-diol, hexane-1,6-diol, 2,2-dimethylpropane-1,3-diol and polyethylene glycols and polypropylene glycols, or polyhydric aliphatic alcohols which contain 2–7 ether atoms in the molecule; compare German Auslegeschrift 1,054,620.

Carboxylic acids or alcohols which have a higher functionality are employed for branched polyesters, glycerol, 1,1,1-trimethylolpropane, hexanetriol and pentaerythritol being mentioned (compare, for example, German Patent Specification 1,105,160 and German Auslegeschrift 1,029,147). The molecular weights of the polyesters are between about 800 and 10,000, the OH numbers are between about 0.1 and 100 and the acid numbers are between about 0.1 and 80. The residual water contents of the polyesters are in general less than 0.1%. If desired, it is also possible to employ particular polyesters, for example with a narrow molecular weight distribution, which are obtained by polymerization of lactones, such as, for example, β-propiolactone, γ-butyrolactone or ε-caprolactone, or have been synethized by copolymerization of epoxides with cyclic anhydrides; compare K. Hamann, Makrom. Chem. 51 (1962) 53 and R. F. Fischer, J. Poly. Sci. 44 (1960) 155.

The polyesters can be employed by themselves or as mixtures with other polyesters or, if appropriate, also polyethers.

The polyethers which can be used according to the invention and have at least one, and as a rule two to eight, preferably two to three, hydroxyl groups in the molecule, are those of a type which is known per se and are obtained, for example, by homo-polymerization of epoxides, such as ethylene oxide, propylene oxide, butylene oxide, tetrafuran, styrene oxide or epichlorohydrin, for example in the presence of $BF_3$, or by addition of these epoxides, optionally as a mixture or successively, onto starting components with reactive hydrogen atoms, such as water, alcohols or amines, for example ethylene glycol, propylene-1,3-glycol or -1,2-glycol, trimethylolpropane, 4,4'-dihydroxydiphenylpropane, aniline, ammonia, ethanolamine or ethylenediamine. Sucrose polyethers, such as are described, for example, in German Auslegeschriften 1,176,358 and 1,064,938, can also be used according to the invention. Polyethers which predominantly contain primary OH groups (up to 90% by weight, relative to all the OH groups present in the polyether) are frequently preferred. Polyethers modified by vinyl polymers, such as the polyethers formed, for example, by polymerization of styrene or acrylonitrile in the presence of polyethers (U.S. Pat. Nos. 3,383,351, 3,304,273, 3,523,093 and 3,110,695 and German Patent No. 1,152,536) are likewise suitable, as are polybutadienes containing OH groups.

Amongst the polythioethers, there may be mentioned, in particular, the products of self-condensation of thiodiglycol and/or of the condensation of thiodiglycol with other glycols, dicarboxylic acids, formaldehyde, aminocarboxylic acids or aminoalcohols. The products are mixed polythioethers, polythioether-esters or polythioether-ester-amides, depending on the co-components.

The aliphatic or mixed aliphatic-aromatic polyesters and polyethers employed can optionally be in an acylated form. The free OH groups of the polyester and polyether can be acylated in a known manner with carboxylic acid anhydrides or carboxylic acid halides, or by post-condensation with an excess or stoichiometric amount of a mono- or di-carboxylic acid. Acylation with acetic anhydride can be carried out in a particularly simple manner. The acylation can be carried out before, during or after the grafting polymerisation. If the acylation is carried out before the grafting reaction, a procedure can be followed in which the polyester and polyether are reacted with a particular amount of acetic anhydride. The acylation takes place very rapidly at elevated temperatures (100°-180° C.), and, if desired, the acetic acid formed and unreacted acetic anhydride can then be stripped off. However, it is not necessary to remove these components since the use even of the crude acylation product for the grafting reaction presents no problems. The acylation can also be carried out during the polymerization of the vinyl compounds without having an adverse effect on the further course of the reaction, since the acylation does not interfere with the polymerization. Furthermore, it is of course possible for the co-grafted polymer dispersion formed also to be reacted with the acylating agent only after the vinyl polymerization has ended.

Examples of vinyl monomers which may be mentioned are: olefins, such as ethylene, propylene and isobutylene, vinyl esters of aliphatic or aromatic carboxylic acids, preferably vinyl acetate and vinyl propionate, $\alpha,\beta$-unsaturated mono- or di-carboxylic acids and derivatives thereof, examples being (meth)acrylic acid, methyl (meth)acrylate, ethyl (meth)acrylae, propyl or isopropyl (meth)acrylate, n-butyl, iso-butyl or tert.-butyl (meth)acrylate, 2-ethylhexyl (meth)acrylate, (meth)acrylamide, N-alkyl-substituted (meth)acrylamide derivatives, (meth)acrylonitrile, maleic anhydride, maleamide, N-alkyl-maleimides and maleic acid half-esters or diesters, vinyl-aromatic compounds, such as styrene, $\alpha$-methylstyrene and 4-chlorostyrene, vinyl chloride, vinylidene chloride, vinylidene fluoride, tetrafluoroethylene and vinyl ethers, such as ethyl vinyl ether and n-butyl vinyl ether; and from the series of allyl compounds there may be mentioned allyl alcohol, allyl acetate, isobutene diacetate, 2-methylenepropane-1,3-diol, allyl ethyl carbonate and allyl phenyl carbonate. If crosslinking or increase in the molecular weights of the vinyl resin phase is desired, poly-unsaturated vinyl compounds or allyl compounds can be employed. Compounds which may be mentioned are divinylbenzene, (meth)acrylates of polyhydric alcohols, such as, for example, ethylene glycol dimethacrylate and diethylene glycol diacrylate, and divinyl ether.

The free radical polymerization of the vinyl monomers can be started in a manner which is known per se, with the aid of agents which form free radicals, UV-rays or $\alpha$-, $\beta$- or $\gamma$-rays or by means of heat, without further additives. Polymerization initiated by radiation is preferably carried out in the presence of sensitizers; compare, for example, A. D. Jenkins, A. Ledwith, Reactivity, Mechanism and Structure in Polymer Chemistry, John Wiley and Son, London, New York, 1974, page 465.

To start the free radical polymerization of the vinyl monomers, agents which form free radicals are employed in amounts of between 0.001 and 2, preferably 0.02 and 0.8, % by weight, relative to the total mixture of organopolysiloxane, polyester and vinyl monomer. Examples of agents which form free radicals which may be mentioned are azo initiators, such as azo-bis-isobutyronitrile (AIBN), azo-esters, azo-imino-esters or azo-N-alkylamides, peroxides, such as di-tert.-butyl peroxide, di-cumyl peroxide and di-benzoyl peroxide, peresters, such as amyl perpivalate, tert.-butyl perpivalate, tert.-butyl peroctoate, tert.-butyl perbenzoate and tert.-butyl perneodecanoate, percarbonates, such as cyclohexyl percarbonate or bis-isopropyl percarbonate, or hydroperoxides, such as, for example, cumyl hydroperoxide and tert.-butyl hydroperoxide.

Other suitable initiators are benzopinacol, benzopinacol derivatives or other highly substituted ethane derivatives which are heat-labile.

The polymerization can also be started with the aid of redox systems at lower temperatures than the temperatures at which the agents which form free radicals decompose purely thermally.

Examples of redox initiators which may be mentioned are combinations of peroxides and amines, such as for example, benzoyl peroxide and triethylamine, trialkyl-boron compounds and oxygen, hydroperoxides and sulphinic acids, formaldehyde or aldoses or combinations thereof and low-valent transition metal salts, or peroxide/$SO_2$ systems.

The polymerization reaction can be carried out continuously or discontinuously, under normal pressure or under reaction pressures of up to, for example, 300 bars, preferably up to 15 bars, and at reaction temperatures between about $-20°$ C. and $+250°$ C., preferably about 70° to 190° C. If desired, the polymerization can also be carried out in the presence of solvents or diluents, of which there may be mentioned water, alcohols, such as methanol, ethanol and tert.-butanol, aliphatic or aromatic hydrocarbons, halogenated hydrocarbons, such as chlorobenzene or fluorinated compounds, ethers, such as dioxane or tetrahydrofuran, and esters, such as, for example, ethyl acetate.

The polymerization is preferably carried out, however, in the absence of a solvent.

If desired, the polymerization reaction can be carried out in the presence of agents which regulate the molecular weight. Examples of molecular weight regulators which may be mentioned are mercaptans, such as n- or tert.-dodecylmercaptan, thioglycol, thioglycerol and thioacetates, and also sulphur-free molecular weight regulators, such as hydrocarbons, examples which may be mentioned being paraffin fractions, such as, for example, petroleum ether, light petrol or wash benzine, and α-olefins, such as, for example, propylene, isobutylene and 1-butene, and furthermore ketones, such as, for example, acetone, methyl ethyl ketone or cyclohexanone, and also aldehydes, such as, for example, formaldehyde, acetaldehyde, propionaldehyde or isobutyraldehyde, and allyl compounds, such as, for example, allyl alcohol, allyl acetate, isobutene diacetate or allyl carbonates. Other possible telogens are halogenated hydrocarbons, such as methylene chloride, tetrachloroethane, dibromoethane and the like. As is to be expected, the viscosities of the dispersions can be controlled with the aid of such molecular weight regulators.

The reaction of the monomers employed is determined by the polymerization process chosen and the reaction conditions. In the case of a discontinuous polymerization procedure, the objective is conversions which are as high as possible, so that at least 80% of the monomers employed, but preferably more than 90%, are reacted. The residual monomers are removed by known processes, by distillation under normal pressure or under reduced pressure. The residual monomer contents still effectively found in the dispersions after working up are negligibly small; they are in general less than 1,000 ppm, and preferably less than 100 ppm.

If desired, antioxidants, stabilizers, UV-absorbers, anti-aging agents, plasticizers and substances having a fungistatic or bacteriostatic action can be introduced into the batch when the polymerization has ended.

The fillers customarily used in the preparation of silicone elastomers can also be employed. Such fillers are silicas which have been prepared by various processes and have various specific surface areas.

The silicone/polyester/vinyl polymer dispersions obtained according to the invention are particularly suitable for use in 1- and 2-component compositions which are cured at room temperature. As is known, such compositions, which are cured in accordance with the condensation principle, consist of polydiorganosiloxanes with hydroxyl end groups, crosslinking agents, fillers and catalysts.

All or some of the polydiorganosiloxanes with hydroxyl end groups can be replaced by the co-grafted polymer dispersions according to the invention. Silanes which have, in the molecule, at least 3 groups which can easily be split off hydrolytically, such as carboxylic acid groups, carboxamide groups, oxime groups, amine oxide groups and amine groups, are employed as the crosslinking agents. Examples of reinforcing fillers are pyrogenically produced silicon dioxide, and a nonreinforcing filler which can be used is, for example, chalk. The catalysts used are, inter alia, organic tin compounds, such as dibutyl-tin dilaurate. The silicone compositions in which the co-grafted polymer dispersions according to the invention are used can be coated with commercially available lacquers, for example lacquers based on alkyd resins or polyurethanes, considerably better than the silicone compositions known hitherto.

The following examples illustrate the preparation of the silicon/polyester/vinyl monomer dispersions according to the invention. Unless otherwise indicated, the amounts given are to be understood as parts by weight or percentages by weight.

PREPARATION OF THE STARTING SUBSTANCES

The polysiloxanes containing OH functional groups are prepared by the procedure known from the literature; compare W. Noll, Chemie und Technologie der Silicone (Chemistry and Technology of the Silicones), Verlag Chemie GmbH, Weinheim/Bergstr., 2nd edition, 1968, chapter 5, page 162 et seq.

The polydimethylsiloxanes containing OH functional groups which are listed in the examples are characterized as follows:

| OH—polysiloxane No. | Viscosity [mPas] at 20° C. |
|---|---|
| 1 | 5,000 |
| 2 | 10,000 |
| 3 | 18,000 |
| 4 | 50,000 |

The polyesters are prepared by condensation in the melt, the water of reaction formed being distilled off until the OH and acid numbers reach the desired values; compare Houben-Weyl, Methoden der Organischen Chemie (Methods of Organic Chemistry), volume XIV/2, Georg Thieme-Verlag, Stuttgart, 1963, page 1 et seq. The most important characteristic data of the polyesters used are summarized in Table 1:

TABLE 1

| Polyester | Composition of the polyester | OH number | Acid number |
|---|---|---|---|
| A | Adipic acid and diethylene glycol | 40 | 1 |
| B | Adipic acid, ethylene glycol and butane-1,4-diol | 55 | 1 |
| C | Phthalic acid, isophthalic acid, ethylene glycol and neopentylglycol | 120 | 18 |
| D | as B | 19.5 | 1 |
| E | Phthalic acid, maleic acid, propane-1,2-diol and dipropylene glycol | 34 | 20 |
| F* | Adipic acid, diethylene glycol and acetic acid | 1 | 1 |

*Polyester F is prepared by reacting polyester A with a stoichiometric amount of acetic anhydride at 130° C. for 3 hours and then distilling off volatile constituents in vacuo at 130-150° C.

The polyether A employed for the grafting reaction as a mixture with polyesters is a trifunctional copolyether of ethylene oxide and propylene oxide. The OH number is 49 and the viscosity is 520 [mPas] at 20° C.

EXAMPLE 1

14,390 g of polyester A and 23,480 g of polysiloxane 1 are initially introduced into a 100 l autoclave. The autoclave is evacuated and the pressure is balanced with nitrogen. After heating to 120° C., 2 solutions are simultaneously pumped in over a period of 3 hours:
Solution 1: 5,000 g of polysiloxane 1, 4,707 g of vinyl acetate and 37.5 g of tert.-butyl perpivalate
Solution 2: 9,683 g of vinyl acetate.

After adding solutions 1 and 2, the mixture is subsequently stirred for a further hour at 120° C. A monomer conversion of 82.4% is determined by analysis by gas chromatography. The volatile constituents are removed from the batch by distillation in vacuo under 1 mm Hg, at a bottom temperature of 120°–125° C. After distilladispersions are worked up in a spiral tube evaporator with a volume of 2 l. Nitrogen, steam or steam/nitrogen mixtures, as desired, are employed as the stripping gases. The product is introduced into the spiral tube evaporator (10 kg/hour) by means of a gear pump. A maximum product temperature of 150°–155° C. is achieved in the discharged material at an external temperature of 190°–200° C. The volatile constituents are separated off via cooling with water. The residual monomer contents are determined by gas chromatography.

| Example No. | Initial mixture | | | | Solution | | | | tert.-Butyl perpivalate | Residual vinyl acetate content | Viscosity mPas | Composition | | |
|---|---|---|---|---|---|---|---|---|---|---|---|---|---|---|
| | Polyester | | Polysiloxane | | Polyester | | Polysiloxane | | | | | Polyester | Polysiloxane | Polyvinyl acetate |
| | A | B | 1 | 2 | Vinyl acetate | A | B | 1 | 2 | | | | | | |
| 3 | — | 3250 | — | 6500 | 6500 | — | 3250 | — | 6500 | 15 | 31 ppm | 50,000 | 25.22 | 50.44 | 23.34 |
| 4 | 3250 | — | 6500 | — | 6500 | 3250 | — | 6500 | — | 15 | 55 ppm | 47,000 | 25.35 | 50.70 | 23.95 |
| 5 | 3250 | — | — | 6500 | 6500 | 3250 | — | — | 6500 | 15 | 23 ppm | 60,000 | 25.3 | 50.6 | 23.10 | tion for 3 hours, while stirring, 24 ppm of vinyl acetate are detected in the grafted batch by analysis by gas chromatography. Removal of the residual monomer is therefore ended. The batch has a viscosity of 40,000 mPas at 25° C. The co-grafted polymer dispersion has the following composition: 52.3% of polysiloxane 1, 26.15% of polyester A and 21.55% of polymerized vinyl acetate units.

EXAMPLE 2

4,428 g of polyester A and 34,036 g of polysiloxane 1 are initially introduced into a 100 l reactor. The reactor is evacuated and the pressure is balanced with nitrogen. After warming the mixture to 120° C., a solution of 12,840 g of polyester A, 17,268 g of vinyl acetate and 36.5 g of tert.-butyl perpivalate is introduced into the reactor in the course of 3 hours. The internal temperature is kept constant at 120° C. After addition of the solution, a solution of 10.5 g of tert.-butyl perpivalate in 100 g of polysiloxane 1 is rapidly added. The batch is kept at 120° C. for a further hour (monomer conversion at this point in time: 93%). The volatile constituents are then stripped off over a distillation bridge under 1 mm Hg and at a bottom temperature of 120° C. The distillation is ended after 2 hours (81 ppm of vinyl acetate can still be detected by gas chromatography). The co-grafted polymer dispersion has a viscosity of 46,000 mPas and has the following composition: 50.51% by weight of polysiloxane 1, 25.25% by weight of polyester A and 24.24% by weight of polymerized vinyl acetate units.

EXAMPLE 6

9,200 g of polysiloxane 2, 6,500 g of polyester A and 2,600 g of a polydimethylsiloxane with a molecular weight of about 25,000 are initially introduced into a 40 l autoclave. The autoclave is evacuated and the pressure is balanced with nitrogen. The batch is warmed to 120° C. The following solutions are then added in the course of 3 hours: solution 1: 6,500 g of vinyl acetate; solution 2: 1,200 g of polysiloxane 2 and 15 g of tert.-butyl perpivalate. The internal temperature is kept at 120° C. When addition of the solutions has ended, the mixture is subsequently stirred for a further hour at 120° C. The autoclave is evacuated and the volatile constituents are stripped off over a distillation bridge under a vacuum of 10 mm Hg. After cooling, a fine-particled, homogeneous dispersion with a viscosity of 35,000 mPas at 25° C. and the following composition is obtained: 51.6% of polysiloxane, 25.8% of polyester and 22.6% of polymerized vinyl acetate units.

EXAMPLES 7–8

The initial mixture is introduced into a 6 l stirred kettle. The mixture is warmed under nitrogen to the temperature indicated. The solution is then added in the course of 2 hours.

When the addition has ended, the batch is subsequently stirred for 1 hour. The volatile constituents are stripped off over a distillation bridge under 20 mm Hg and a bottom temperature of 120° C.

| Example No. | Initial mixture | | | Solution | | | | | Viscosity mPas | Composition | | |
|---|---|---|---|---|---|---|---|---|---|---|---|---|
| | Polyester B | Polysiloxane 1 | Temperature °C. | Polyester B | Polysiloxane 1 | Vinyl acetate | tert.-butyl perpivalate | tert.-butyl peroctoate | | Polyester | Polysiloxane | Polyvinyl acetate |
| 7 | 500 | 1,000 | 120 | 500 | 1,000 | 1,000 | — | 5.0 | 53,000 | 25.2 | 50.2 | 24.6 |
| 8 | 500 | 1,000 | 110 | 500 | 1,000 | 1,000 | 3.0 | — | 28,000 | 25.3 | 50.8 | 23.9 | tate units.

EXAMPLES 3–5

The components listed under "Initial mixture" are introduced into a 40 l autoclave. The autoclave is then evacuated and flushed with nitrogen. The mixture is warmed to 110° C. and the solution is added in the course of 3 hours. The mixture is then subsequently stirred at 110° C. for 2 hours. The co-grafted polymer

EXAMPLES 9–10

400 g of polyester A are initially introduced into a 2 l stirred kettle. The initial material is warmed to 150° C., while passing over nitrogen. The solution is then added in the course of 2 hours and the mixture is then subsequently stirred at 150° C. for 1 hour. The volatile constituents are stripped off over a laboratory thin film evaporator under a vacuum of 1 mm Hg and at a heating jacket temperature of 150° C. The container for collecting the product is heated (120° C.).

initial mixture is warmed to 110° C. and the following two solutions are simultaneously added, while passing over nitrogen: solution 1: 800 g of polysiloxane 2 and 2.25 g of tert.-butyl perpivalate; solution 2: 500 g of

| Example No. | Solution | | | | | Viscosity mPas | Composition in % by weight | | | | |
|---|---|---|---|---|---|---|---|---|---|---|---|
| | Polysiloxane 1 | Styrene | n-butyl-acrylate | Acrylo-nitrile | tert.-Butyl peroctoate | | Polyester | Poly-siloxane | Styrene | n-Butyl acrylate | Acrylo-nitrile |
| 9 | 800 | 200 | 150 | 50 | 4.0 | 50,000 | 25.8 | 51.6 | 11.3 | 8.4 | 2.9 |
| 10 | 800 | 150 | 150 | 100 | 4.0 | 78,000 | 25.8 | 51.5 | 8.5 | 8.5 | 5.7 |

EXAMPLES 11-12

The amount of polysiloxane indicated is initially introduced into a 2 l stirred kettle. The polysiloxane is warmed to 150° C., while passing over introgen, and the solutions are added in the course of 2 hours. When the addition has ended, the mixture is subsequently stirred at 150° C. for 1 hour. The volatile constituents are stripped off over a laboratory thin film evaporator under a vacuum of 15 mm Hg and at a heating jacket temperature of 150° C., and the container for collecting the product is kept at 120° C.

polyester A and 1,000 g of vinyl acetate. Addition of the solutions is complete after 2 hours. The mixture is subsequently stirred for a further hour at 110° C. The volatile constituents are removed by vacuum distillation (1 mm Hg, 110° C.). The vinyl acetate conversion is 94.4%. The dispersion has a viscosity of 34,000 mPas at 20° C. and the following composition: 45.0% of polysiloxane, 11.3% of grafted product from Example 4, 22.5% of polyester A and 21.2% of vinyl acetate.

EXAMPLE 15

6,942 g of polyester A and 11,328 g of polysiloxane 1

| Example No. | Initial mixture Poly-siloxane 1 | Solution 1 | | | Solution 2 | | Vis-cosity | Composition | | |
|---|---|---|---|---|---|---|---|---|---|---|
| | | Polyester | | Styrene | Poly-siloxane 1 | tert.-Butyl peroctoate | | Polysiloxane | Polyester | Styrene |
| | | C | D | | | | | | | |
| 11 | 200 | 200 | — | 200 | 200 | 2 | 21,000 | 50.0 | 25.1 | 24.9 |
| 12 | 200 | — | 200 | 200 | 200 | 2 | 41,000 | 50.9 | 25.5 | 23.6 |

EXAMPLE 13

800 g of polysiloxane 1 are initially introduced into a 2 l stirred kettle and are heated to 150° C., while passing over nitrogen. The following solutions 1 and 2 are then simultaneously added in the course of 2 hours: solution 1: 800 g of polyester A, 130 g of polyester E, 70 g of styrene and 200 g of n-butyl acrylate; solution 2: 800 g of polysiloxane 1 and 4 g of tert.-butyl peroctoate. When the addition has ended, the mixture is subsequently stirred for a further hour at 150° C. The volatile constituents are stripped off in a laboratory thin film evaporator under a vacuum of 18 mm Hg and at a heating jacket temperature of 150° C. The finished dispersion has a viscosity of 34,000 mPas at 25° C. and has the following composition: 57.5% of polysiloxane, 33.5% of polyester, 2.5% of styrene and 6.5% of n-butyl acrylate.

EXAMPLE 14

800 g of polysiloxane 2, 400 g of polydimethylsiloxane with a molecular weight of 25,000, 500 g of polyester A and 500 g of the grafted product from Example 4 are initially introduced into a 6 l stirred kettle. The are initially introduced into a 40 l stirred autoclave. The mixture is warmed to 110° C., while passing over nitrogen. The following two solutions are simultaneously metered in at 110° C.: solution 1: 2,557 g of polysiloxane 1, 2,271 g of vinyl acetate and 22.5 g of tert.-butyl perpivalate; solution 2: 9,683 g of vinyl acetate. When the addition has ended, the mixture is subsequently stirred at 110° C. for 1 hour. The volatile constituents are then removed by vacuum distillation. The vinyl acetate conversion is 91.6%. The composition of the co-grafted polymer dispersion is: 43.7% of polysiloxane, 34.5% of vinyl acetate and 21.8% of polyester A.

The viscosity is 62,000 mPas at 25° C.

EXAMPLES 16-19

350 g of polysiloxane 1 and 200 g of polyester A are initially introduced into a 2 l stirred kettle. The mixture is warmed to the temperature indicated, while passing over nitrogen. The solution is then added in the course of 2 hours and the mixture is subsequently stirred for 1 hour. The volatile constituents are distilled off in vacuo at 130° C. and under 15 mm Hg.

| Example No. | Solution | | | | tert.-butyl per-pivalate | Vis-cosity mPas | Composition | | | | |
|---|---|---|---|---|---|---|---|---|---|---|---|
| | Vinyl acetate | n-Butyl acrylate | Acrylo-nitrile | Poly-siloxane 1 | | | Poly-siloxane | Poly-ester | Vinyl acetate | Acrylo-nitrile | n-Butyl acrylate |
| 16 | — | 200 | — | 100 | 1.5 | 35,900 | 53.1 | 23.7 | — | — | 23.2 |
| 17 | — | 150 | 50 | 100 | 1.5 | 40,000 | 55.0 | 24.4 | — | 4.5 | 16.1 |
| 18 | 80 | 80 | 40 | 100 | 1.5 | 37,200 | 57.8 | 25.7 | 5.8 | 2.4 | 8.3 |
| 19 | 100 | 100 | — | 100 | 1.5 | 47,700 | 55 | 24.5 | 9.5 | — | 11 |

EXAMPLE 20

1,000 g of polyester A, 1,600 g of polysiloxane 1 and 52 g of acetic anhydride are warmed under nitrogen to 120° C. A solution of 1,000 g of vinyl acetate, 400 g of polysiloxane 1 and 4.5 g of tert.-butyl perpivalate is added in the course of 3 hours, while stirring. After subsequently stirring the mixture at 120° C. for 1 hour, the volatile constituents are stripped off in vacuo at 120° C. The dispersion has a viscosity of 44,000 cP and the following composition: 50.6% of polysiloxane, 25.3% of acetylated polyester and 24.1% of polymerized vinyl acetate units.

EXAMPLE 21

1,000 g of polyester A, from which the water has been removed in vacuo for 2 hours at 120° C., and 16,000 g of polysiloxane 1 are warmed under nitrogen to 110° C. A solution of 4.5 g of tert.-butyl perpivalate in 400 g of polysiloxane 1 and 1,000 g of vinyl acetate is then added in the course of 2 hours, while stirring. Thereafter, a solution of 2.25 g of tert.-butyl perpivalate in 105 g of acetic anhydride is added rapidly and the mixture is subsequently stirred at 110° C. for 2 hours. Volatile constituents are stripped off in vacuo at 120° C. The dispersion formed has a viscosity of 45,000 cP and the following composition: 50.5% of polysiloxane, 25.2% of acetylated polyester and 24.2% of polymerized vinyl acetate units. The OH number of the co-grafted polymer dispersion is 2.5.

EXAMPLE 22

1,600 g of polysiloxane 1, 1,000 g of polyester A and 100 g of a polyethylene glycol ether with a molecular weight of 20,000 (Polywachs 20 000 from Chemische Werke Hüls) are warmed under nitrogen to 110° C. in a 6 l stirred kettle. A solution of 6.0 g of tert.-butyl perpivalate, 500 g of polysiloxane 1 and 1,000 g of vinyl acetate is added dropwise at a constant reaction temperature of 110° C. in the course of 2 hours. The mixture is then subsequently stirred at 110° C. for 2 hours and the volatile constituents are stripped off in vacuo at 110°–130° C. A dispersion with a viscosity of 52,000 mPas and the following composition is obtained: 50.9% of polysiloxane, 24.3% of polyester, 2.4% of polyether and 22.4% of polymerized vinyl acetate units.

EXAMPLE 23

1,600 g of polysiloxane 1, 500 g of polyester A and 500 g of a polyether A are warmed under nitrogen to 110° C. and a solution of 4.5 g of tert.-butyl perpivalate, 400 g of polysiloxane 1 and 1,000 g of vinyl acetate is added in the course of 2 hours. The mixture is then subsequently stirred at 110° C. for 2 hours. The volatile constituents are stripped off in vacuo at 110°–120° C. A dispersion with a viscosity of 40,000 mPas and with the following composition is obtained: 51.0% of polysiloxane, 12.7% of polyester, 12.7% of polyether and 23.6% of polymerized vinyl acetate units.

EXAMPLES 24–27

General Instructions

The initial mixture is warmed under an inert gas to 110° C. in a 6 l stirred kettle. The solution is added in the course of 2 hours and the mixture is then subsequently stirred at 110° C. for 1 hour. The residual monomers are removed in vacuo at 110° C.–120° C.

| Example No. | Initial mixture | | | | | Solution | | | | Composition in % by weight | | | |
|---|---|---|---|---|---|---|---|---|---|---|---|---|---|
| | Polysi-loxane 1 | Polyester A | Polyester B | Polyester D | Poly-ether A | Polysi-loxane 1 | Vinyl acetate | tert.-Butyl perpivalate | Viscosity mPas | Polysi-loxane | Poly-ester | Poly-ether | Polymerized vinyl acetate units |
| 24 | 1,600 | — | 500 | — | 500 | 400 | 1,000 | 4.5 | 52,000 | 51.3 | 12.8 | 12.8 | 23.1 |
| 25 | 1,600 | — | — | 800 | 200 | 400 | 1,000 | 4.5 | 52,000 | 51.0 | 20.4 | 5.1 | 23.5 |
| 26 | 1,600 | 800 | — | — | 200 | 400 | 1,000 | 4.5 | 50,000 | 50.8 | 20.3 | 5.0 | 23.9 |
| 27 | 1,600 | — | 800 | — | 200 | 400 | 1,000 | 4.5 | 48,000 | 51.4 | 20.6 | 5.2 | 22.8 |

EXAMPLE 28

1,600 g of polysiloxane 1, 200 g of polyether A and 800 g of polyester A are warmed to 110° C. in a 6 l stirred kettle. A solution of 4.5 g of tert.-butyl perpivalate in 400 g of polysiloxane 1 and 1,000 g of vinyl acetate is then added in the course of 2 hours. Thereafter, a solution of 3.0 g of tert.-butyl perpivalate in 90 g of acetic anhydride is added dropwise in the course of 5 minutes. The mixture is then subsequently stirred at 110° C. for 2 hours.

The volatile constituents are stripped off in vacuo at 110°–120° C. The co-grafted polymer dispersion has a viscosity of 60,000 mPas and an OH number of 5. The composition is: 24.0% of polymerized vinyl acetate units, 5.1% of acetylated polyether, 20.3% of acetylated polyester and 50.6% of polysiloxane.

EXAMPLE 29

1,000 g of polyester F and 1,600 g of polysiloxane 1 are warmed under nitrogen to 110° C. in a 6 l stirred kettle. A solution of 1,000 g of vinyl acetate, 400 g of polysiloxane 1 and 4.5 g of tert.-butyl perpivalate is added in the course of 2 hours. The mixture is then subsequently stirred for 1 hour. The volatile constituents are stripped off in vacuo at 110°–120° C. The resulting co-grafted polymer dispersion has a viscosity of 35,000 mPas and the following composition: 50.7% by weight of polysiloxane, 25.3% by weight of polyester C and 24.0% by weight of polymerized vinyl acetate units.

The compositions prepared by the processes described here were mixed and cured in the presence of atmospheric moisture with the aid of crosslinking agents and catalysts which promote crosslinking, according to the following recipe:

200 g of co-grafted polymer dispersion, 10.4 g of a titanium complex of the following approximate composition:

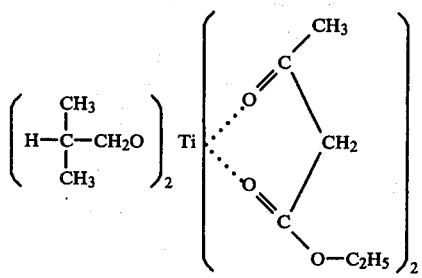

11.4 g of bis-(N-methylbenzamido)-ethoxymethylsilane and 2.2 g of dibutyl-tin diacetate.

The crosslinked products are elastic and free from tackiness. They were coated with an alkyd lacquer, the adhesion of which to the silicone was determined after 7 days with the aid of the cross-hatch test, by cutting a 2.54 cm square on the painted surface into 100 square pieces of equal size with a razor blade, so that a painted surface with a grid-like appearance is obtained. A strip of adhesive tape (tesafilm No. 101 from Messrs. Beiersdorf AG, Hamburg) is then pressed firmly onto this grid. The strip of adhesive tape is then removed by slowly pulling it off at an angle of about 30°. The percentage value of the retention of the lacquer is obtained from the number of painted square pieces which remain on the cured formulation after removal of the strip of adhesive tape. The physical properties and results of the cross-hatch test can be seen from the following table. For comparison Examples 31 and 32, polydimethylsiloxanes with hydroxyl end groups were used instead of the co-grafted polymers, the polydimethylsiloxane in Example 31 having a viscosity of 5 Pa.s and that in Example 32 having a viscosity of 50 Pa.s.

| Example No. | Evenness of the lacquer | Adhesion of the lacquer (%) | E-modulus (100% elongation) (N/mm$^2$) | Tensile strength (N/mm$^2$) | Elongation at break (%) |
|---|---|---|---|---|---|
| 1 | good | 89 | 0.236 | 0.379 | 272 |
| 2 | good | 68 | 0.245 | 0.363 | 239 |
| 3 | good | 83 | 0.201 | 0.337 | 300 |
| 4 | good | 86 | 0.206 | 0.361 | 315 |
| 6 | good | 75 | 0.216 | 0.333 | 262 |
| 8 | good | 99 | 0.224 | 0.384 | 316 |
| 9 | good | 86 | 0.707 | 1.304 | 340 |
| 10 | good | 93 | 0.484 | 1.312 | 419 |
| 11 | good | 100 | 0.385 | 1.220 | 410 |
| 12 | good | 89 | 0.378 | 1.000 | 344 |
| 13 | good | 86 | 0.242 | 0.367 | 289 |
| 14 | good | 82 | 0.180 | 0.442 | 475 |
| 15 | good | 91 | 0.199 | 0.525 | 415 |
| 16 | good | 82 | 0.118 | 0.306 | 351 |
| 17 | good | 95 | 0.163 | 0.458 | 461 |
| 18 | good | 98 | 0.178 | 0.576 | 509 |
| 19 | good | 95 | 0.137 | 0.431 | 445 |
| 20 | good | 100 | 0.171 | 0.510 | 450 |
| 21 | good | | 0.199 | 0.319 | 280 |
| 22 | good | 97 | | | |
| 23 | good | | 0.114 | 0.342 | 396 |
| 24 | good | | 0.089 | 0.400 | 774 |
| 25 | good | | 0.138 | 0.353 | 353 |
| 26 | good | | 0.148 | 0.414 | 464 |
| 27 | good | | 0.127 | 0.309 | 388 |
| 28 | good | | 0.107 | 0.384 | 509 |
| 29 | good | 95 | 0.106 | 0.314 | 568 |
| 31 | poor | 0 | 0.141 | 0.299 | 295 |
| 32 | poor | 18 | 0.097 | 0.313 | 544 |

Fillers and plasticizers can be added to the co-grafted polymers in the same manner as to polydiorganosiloxanes with hydroxyl end groups, this manner being familiar to the expert. Some co-grafted polymers were mixed according to the following recipe: 45.2 parts of co-grafted polymer, 20 parts of polydimethylsiloxane with methyl end groups and with a viscosity of 1 Pa.s, 4.5 parts of Aerosil R 972 from Messrs. Degussa and 20 parts of Omya chalk.

Elastomers obtained from these filled compositions have the following mechanical properties:

| Example | E-modulus (100% elongation) N/mm$^2$ | Tensile strength N/mm$^2$ | Elongation at break % |
|---|---|---|---|
| 3 | 0.17 | 0.41 | 490 |
| 4 | 0.19 | 0.38 | 325 |
| 5 | 0.19 | 0.39 | 410 |
| 7 | 0.17 | 0.38 | 420 |
| 8 | 0.17 | 0.38 | 390 |
| 32 | 0.14 | 0.70 | 550 |

It will be understood that the specification and examples are illustrative but not limitative of the present invention and that other embodiments within the spirit and scope of the invention will suggest themselves to those skilled in the art.

We claim:

1. A room-temperature curable co-grafted polymer comprising units of an organopolysiloxane polymer with at least two OH functional groups, a polyester polymer and of a vinyl monomer, polymeric units of the vinyl monomer linking the organopolysiloxane to the polyester units.

2. A polymer according to claim 1, wherein at least part of the polyester units are acylated.

3. A polymer according to claim 1, further including polyether units.

4. A polymer according to claim 1, comprising by weight about 10 to 90% of the polysiloxane units, about 5 to 85% of polyester units, 0 to 50% of polyether units and about 5 to 85% of vinyl units.

5. A polymer according to claim 1, wherein the vinyl units are units of at least one of vinyl esters, $\alpha,\beta$-unsaturated carboxylic acids, derivatives of $\alpha,\beta$-unsaturated mono- or di-carboxylic acids, vinyl-aromatic compounds, $\alpha$-olefins, halogenated vinyl monomers, vinyl ethers, allyl compounds, divinyl compounds and (meth) acrylic acid esters of polyhydric alcohols.

6. A polymer according to claim 4, wherein the 5 to 85% of vinyl units comprise 0–85% of vinyl acetate units and 5–80% of units of at least one of alkyl(meth) acrylates with 1–8 C atoms in the alkyl component, (meth)acrylamide, N-alkyl-substituted (meth)acrylamides and (meth)acrylonitrile.

7. A polymer according to claim 1, comprising by weight about 30–90% of the polysiloxane units, about 5–65% by weight of aliphatic or mixed aliphatic-aromatic polyester units, 0 to about 50% of polyether units, and about 5–65% by weight of units of (a) about 50–90% of styrene, (b) about 10–95% of alkyl(meth)acrylates with 1–8 C atoms in the alkyl component and (c) 0 to about 85% of (meth)acrylonitrile, the sum of (a), (b) and (c) being 100% by weight.

8. A polymer according to claim 1, comprising by weight about 30–90% of the polysiloxane units, about 5–65% of aliphatic or mixed aliphatic-aromatic polyester units, and about 5–65% of vinyl acetate units.

9. A polymer according to claim 1, comprising by weight about 10-90% of polysiloxane units, 0 to about 30% of organopolysiloxane units with trimethylsilyl end groups, about 5-60% of aliphatic or mixed aliphatic aromatic polyester units, and about 5-85% vinyl monomer units.

10. A process for the preparation of a copolymer according to claim 1, comprising polymerizing at a temperature from room temperature up to about 250° C. a mixture comprising by weight about 8-90% of organopolysiloxanes containing terminal OH functional groups, 4.999 to about 85% of aliphatic or mixed aliphatic-aromatic polyesters, 0 to about 50% of a polyether, about 5-85% of at least one vinyl monomer, 0.001 to about 2% of at least one agent which forms free radicals, 0 to about 5% of a molecular weight regulator, and 0 to about 5% of a carboxylic acid, carboxylic acid anhydride or carboxylic acid halide.

11. In a room temperature curable composition comprising an organopolysiloxane, a silane having in its molecule at least 3 groups which can readily be split off hydrolytically as cross-linking agent, and a cross-linking catalyst, the improvement wherein the organopolysiloxane at least in part comprises a copolymer according to claim 1.

12. A polymer according to claim 1, wherein the acid units of the polyester are selected from the group consisting of adipic, sebacic terephthalic, phthalic and isophthalic acids, and at least 70% of the organo groups of the organopolysiloxane are methyl with the balance being ethyl, vinyl and/or phenyl.

* * * * *